(12) United States Patent
Blayvas et al.

(10) Patent No.: US 10,007,854 B2
(45) Date of Patent: Jun. 26, 2018

(54) COMPUTER VISION BASED DRIVER ASSISTANCE DEVICES, SYSTEMS, METHODS AND ASSOCIATED COMPUTER EXECUTABLE CODE

(71) Applicant: ANTS TECHNOLOGY (HK) LIMITED., Wanchai (HK)

(72) Inventors: Ilya Blayvas, Rehovot (IL); Pavel Nosko, Yavne (IL); Mica Arie Nachimson, Givaat Brener (IL); Oranit Dror, Rishon Lezion (IL); Ron Fridental, Shoham (IL); Ophir Gvirzer, Rehovot (IL); Gal Perets, Mazkeret Batya (IL); Alex Rosen, Ramat Gan (IL); Denis Simakov, Rehovot (IL); Masha Zeldin, Ramat Gan (IL)

(73) Assignee: ANTS TECHNOLOGY (HK) LIMITED, Wanchai (HK)

( * ) Notice: Subject to any disclaimer, the term of this patent is extended or adjusted under 35 U.S.C. 154(b) by 145 days.

(21) Appl. No.: 15/203,881

(22) Filed: Jul. 7, 2016

(65) Prior Publication Data
US 2018/0012085 A1    Jan. 11, 2018

(51) Int. Cl.
*G06F 3/01*       (2006.01)
*G06K 9/00*      (2006.01)
(Continued)

(52) U.S. Cl.
CPC ......... *G06K 9/00805* (2013.01); *G06F 3/013* (2013.01); *G06K 9/00845* (2013.01);
(Continued)

(58) Field of Classification Search
CPC ....... B60R 1/00; B60R 2300/50; G06F 3/013; G06K 9/00805; G06K 9/00845;
(Continued)

(56) References Cited

U.S. PATENT DOCUMENTS 8,694,195 B2 * 4/2014 Lee .......................... B60R 1/00
340/436
9,459,515 B2 * 10/2016 Stein ..................... G03B 17/02
(Continued)

OTHER PUBLICATIONS

Fuhr et al, On the use of calibration for pedestrian detection in on-board vehicular cameras (Year: 2016).*
(Continued)

*Primary Examiner* — Shan E Elahi
(74) *Attorney, Agent, or Firm* — Soroker Agmon Nordman

(57) ABSTRACT

The present invention includes computer vision based driver assistance devices, systems, methods and associated computer executable code (hereinafter collectively referred to as: "ADAS"). According to some embodiments, an ADAS may include one or more fixed image/video sensors and one or more adjustable or otherwise movable image/video sensors, characterized by different dimensions of fields of view. According to some embodiments of the present invention, an ADAS may include improved image processing. According to some embodiments, an ADAS may also include one or more sensors adapted to monitor/sense an interior of the vehicle and/or the persons within. An ADAS may include one or more sensors adapted to detect parameters relating to the driver of the vehicle and processing circuitry adapted to assess mental conditions/alertness of the driver and directions of driver gaze. These may be used to modify ADAS operation/thresholds.

19 Claims, 8 Drawing Sheets

(51) Int. Cl.
| | |
|---|---|
| *H04N 5/232* | (2006.01) |
| *H04N 5/225* | (2006.01) |
| *H04N 5/247* | (2006.01) |
| *G06K 9/52* | (2006.01) |
| *G06T 7/60* | (2017.01) |
| *H04N 13/00* | (2018.01) |
| *H04N 13/02* | (2006.01) |
| *G06K 9/66* | (2006.01) |
| *H04N 13/128* | (2018.01) |
| *H04N 13/20* | (2018.01) |

(52) U.S. Cl.
CPC ............... *G06K 9/52* (2013.01); *G06K 9/66* (2013.01); *G06T 7/60* (2013.01); *H04N 5/2251* (2013.01); *H04N 5/23229* (2013.01); *H04N 5/23238* (2013.01); *H04N 5/247* (2013.01); *H04N 13/0022* (2013.01); *H04N 13/02* (2013.01); *H04N 13/128* (2018.05); *H04N 13/20* (2018.05); *H04N 2013/0081* (2013.01)

(58) Field of Classification Search
CPC ... G06K 9/52; G06K 9/66; G06T 7/60; H04N 13/0022; H04N 13/02; H04N 2013/0081; H04N 5/2251; H04N 5/23238; H04N 5/247
USPC .............................................. 348/36, 37, 35
See application file for complete search history.

(56) References Cited

U.S. PATENT DOCUMENTS

| | | | | |
|---|---|---|---|---|
| 2006/0208169 | A1* | 9/2006 | Breed | B60N 2/002 250/221 |
| 2006/0274147 | A1* | 12/2006 | Chinomi | B60R 1/00 348/118 |
| 2011/0135200 | A1* | 6/2011 | Chen | G06T 5/003 382/167 |
| 2013/0155236 | A1* | 6/2013 | Ramdeo | H04N 7/183 348/148 |
| 2014/0160249 | A1* | 6/2014 | Ro | H04N 5/23296 348/47 |
| 2014/0313335 | A1* | 10/2014 | Koravadi | H04N 7/181 348/148 |
| 2015/0181175 | A1* | 6/2015 | Camilleri | B60R 1/00 348/148 |
| 2015/0210217 | A1* | 7/2015 | Taylor | B60C 23/0408 342/55 |
| 2015/0211868 | A1* | 7/2015 | Matsushita | G01C 21/32 701/457 |
| 2015/0251602 | A1* | 9/2015 | Baur | B60R 1/00 348/148 |
| 2016/0311323 | A1* | 10/2016 | Lee | B60K 37/06 |
| 2016/0325682 | A1* | 11/2016 | Gupta | B60R 1/00 |
| 2017/0140542 | A1* | 5/2017 | Hodohara | B60R 1/00 |
| 2017/0203706 | A1* | 7/2017 | Reed | B60R 16/0231 |

OTHER PUBLICATIONS

Parisot et al, Real time road traffic classification using on-board bus video camera (Year: 2008).*

* cited by examiner

COMPUTER VISION BASED DRIVER ASSISTANCE DEVICES, SYSTEMS, METHODS AND ASSOCIATED COMPUTER EXECUTABLE CODE

REFERENCES CITED

[A1] Association for Safe International Road Travel (ASIRT), 2016; http://www.asirt.org/

FIELD OF THE INVENTION

The present invention generally relates to the field of driving assistance systems. More specifically, the present invention relates to computer vision based driver assistance devices, systems, methods and associated computer executable code.

BACKGROUND

Hundreds of millions of people worldwide drive their cars every day. Driving is an intrinsically risky process for the drivers, passengers and pedestrians, resulting in over 1.3 million deaths every year and tens of millions of significant injuries per year [A1].

Most of the accidents are results of driver error, distraction or lack of attentiveness and can be avoided or mitigated.

The vehicle driving assistance systems described herein aim to decrease the risks associated with vehicle driving by timely detection of dangerous situations and providing appropriate signals to the driver or to the vehicle controls.

SUMMARY OF THE INVENTION

The present invention includes computer vision based driver assistance devices, systems, methods and associated computer executable code (hereinafter collectively referred to as: "ADAS"). According to some embodiments of the present invention, there may be provided a computer vision based driver assistance system comprising one or more image/video sensors, configured to be mounted on a vehicle, and one or more processors coupled to the sensors and adapted to process images/video captured by the sensors and identify potentially hazardous situations relating to the vehicle. According to some embodiments, the one or more processors may be adapted to assess levels and/or natures/characteristics of potentially hazardous situations and react accordingly. System reactions to hazardous situations may include issuing warnings/alerts to a driver and/or the surroundings and/or may include automatic or semi-automatic activation/manipulation of vehicle systems (e.g. automatic application of the brakes).

According to some embodiments, an ADAS may include one or more fixed image/video sensors and one or more adjustable or otherwise movable image/video sensors. According to some embodiments, fixed image/video sensors may be used to adjust and/or calibrate adjustable/movable image/video sensors. According to some embodiments, an ADAS may include image/video sensors characterized by different dimensions of fields of view. According to further embodiments, a set of image/video sensors characterized by different dimensions of fields of view may be used to complement each other and/or to achieve different goals. For example, wide angle image/video sensors may be used to monitor short distances and sidewise directions, while narrow field image/video sensors are used to monitor specific areas at a farther distance. According to some embodiments, a wide angle image/video sensor may be image/video sensors having a horizontal field of view exceeding 70 Degrees. According to further embodiments, one or more image/video sensors having a horizontal field of view of roughly 75 degrees may be used (or greater). According to further embodiments, one or more image/video sensors having a horizontal field of view of roughly 100 degrees may be used (or greater). According to further embodiments, one or more image/video sensors having a horizontal field of view of roughly 120 degrees may be used (or greater). According to yet further embodiments, a combination of the above described wide angle image sensors may be used. According to some embodiments, a narrow angle image/video sensor may be image/video sensors having a horizontal field of view below 70 Degrees. According to further embodiments, one or more image/video sensors having a horizontal field of view of roughly 60 Degrees may be used (or lesser) According to further embodiments, one or more image/video sensors having a horizontal field of view of roughly 45 Degrees (or lesser). According to yet further embodiments, a combination of the above described narrow angle image sensors may be used. Similarly, wide angle image/video sensors may be used for monitoring, detection and tracking of objects and subjects such as pedestrians, road-signs, traffic lights in sidewise directions and/or near areas, while narrow field image/video sensors are used to monitor remote areas ahead of the vehicle (and/or near areas directly in front of the respective sensor), such as the road lanes, remote vehicles pedestrians and traffic lights ahead. Some embodiments may include an ADAS comprising one wide angle adjustable video/image sensor and two or more narrow angle fixed image/video sensors. For example, an ADAS may include one wide angle adjustable video/image sensor adapted to be mounted on the front of a rearview mirror and two or more narrow angle fixed image/video sensors mounted upon the windshield or headlights/front bumper or other locations of the car.

The ADAS system synergistically utilizes information and advantages from both cameras. On one side, the field of view and direction of the narrow angle camera(s) can be accurately calibrated and maintained in relation to the vehicle body, and such cameras can provide relatively high resolution of remote objects ahead of the vehicle, while the wide angle camera can provide imaging of objects on the sides of the vehicle, providing detection of pedestrians coming from the sides, as well as road signs and traffic lights situated to the side of the vehicle. Matching/Comparing between images from the uncalibrated adjustable wide angle camera to images from the calibrated fixed low angle camera yields the calibration of the wide angle camera.

According to some embodiments of the present invention, an ADAS may include improved image processing. Improving image processing may be achieved by: (1) limiting detailed image processing to specific areas or angles determined to be relevant to the current driving situation, (2) targeted processing designed to identify specific objects, shapes or motions (for example, an image processing algorithm designed to identify other vehicles and specifically monitor their location, orientation and motion may be implemented, or detailed image processing may be performed only in relation to objects moving over a given speed or only above a certain size). According to some embodiments, image processing may include an object size threshold (or other shape/dimension/speed criteria) for processing, in order to avoid image processing in relation to small objects irrelevant to the driving. According to further embodiments, an ADAS may include processing logic adapted to correlate processing to distance, such that images/video of areas that are closer are processed differently than areas that are farther away.

According to some embodiments, an ADAS may also include one or more sensors adapted to monitor/sense an interior of the vehicle and/or the persons within. An ADAS may include one or more sensors adapted to detect parameters relating to the driver of the vehicle and processing circuitry adapted to assess mental conditions/alertness of the driver and modify operational parameters of the ADAS based on the drivers assessed condition. For example, alert thresholds may be adjusted based on driver alertness. Further, directions of driver gaze as well as current awareness may be used to modify ADAS operation. For example, an ADAS system may prioritize areas the driver is not looking towards.

According to some embodiments, an ADAS system may be adapted to determine locations and characteristics (e.g. weight) of persons present in the vehicle and modify/activate safety systems accordingly. For example, an ADAS may deploy airbags in an accident based on passenger location and weight.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
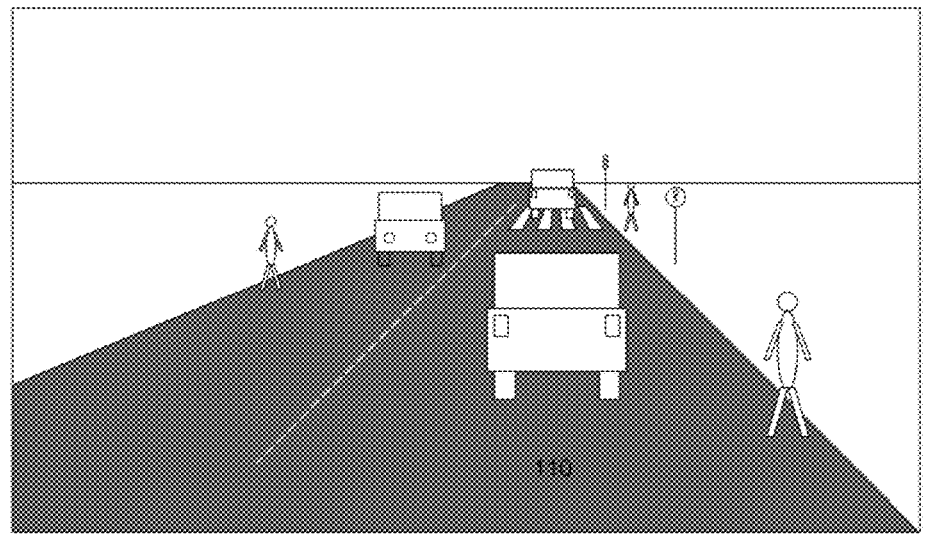
FIG. 1A shows a schematic view of an exemplary road image captured by an exemplary front facing camera mounted on a vehicle, all according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including hard disc drives, Solid State Drives, flash memory, random access memories (RAMs), or any other type of media suitable for storing electronic instructions.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention includes computer vision based driver assistance devices, systems, methods and associated computer executable code (hereinafter collectively referred to as: "ADAS"). According to some embodiments of the present invention, there may be provided a computer vision based driver assistance system comprising one or more image/video sensors, configured to be mounted on a vehicle, and one or more processors coupled to the sensors and adapted to process images/video captured by the sensors and identify potentially hazardous situations relating to the vehicle. According to some embodiments, the one or more processors may be adapted to assess levels and/or natures/characteristics of potentially hazardous situations and react accordingly. System reactions to hazardous situations may include issuing warnings/alerts to a driver and/or the surroundings and/or may include automatic or semi-automatic activation/manipulation of vehicle systems (e.g. automatic application of the brakes).

According to some embodiments, an ADAS may include one or more fixed image/video sensors and one or more adjustable or otherwise movable image/video sensors. According to some embodiments, fixed image/video sensors may be used to adjust and/or calibrate adjustable/movable image/video sensors. According to some embodiments, an ADAS may include image/video sensors characterized by different dimensions of fields of view. According to further embodiments, a set of image/video sensors characterized by different dimensions of fields of view may be used to complement each other and/or to achieve different goals. For example, wide angle image/video sensors may be used to monitor short distances while narrow field image/video sensors are used to monitor specific areas at a farther distance. Similarly, wide angle image/video sensors may be used for general monitoring while narrow field image/video sensors are used to monitor specific areas, such as the vehicles lane. Some embodiments may include an ADAS comprising one wide angle adjustable video/image sensor and two or more narrow angle fixed image/video sensors. For example, an ADAS may include one wide angle adjustable video/image sensor adapted to be mounted on the front of a rearview mirror and two or more narrow angle fixed image/video sensors mounted upon the windshield or headlights/front bumper.

The ADAS system synergistically utilizes information and advantages from both cameras. On one side, the field of view and direction of the narrow angle camera(s) can be accurately calibrated and maintained in relation to the vehicle body, and such cameras can provide relatively high resolution of remote objects ahead of the vehicle, while the wide angle camera can provide imaging of objects on the sides of the vehicle, providing detection of pedestrians coming from the sides, as well as road signs and traffic lights situated to the side of the vehicle. Matching/Comparing between images from the uncalibrated adjustable wide angle camera to images from the calibrated fixed low angle camera yields the calibration of the wide angle camera.

ADAS system configurations including an adjustable camera and a fixed camera may be further used for reconstructing distance to objects using three dimensional stereo matching between the images acquired by the adjustable and the fixed cameras.

Alternatively or additionally, in configurations including two or more fixed cameras, stereo images captured by the fixed cameras can be used to determine distance. In some of the embodiments fixed cameras are designed and constructed in the configuration of a stereo pair, and certain rigidity between the cameras. In some embodiments synchronization between the frames of the video acquired by each camera is performed. The start and stop of the integration time of the corresponding frames may be synchronized within roughly 1 millisecond or better. This is due to a desire to acquire corresponding frames from a controllably similar position in space, separated only by the stereo base between the cameras, and not by the self-motion of unsynchronized cameras, and high speed of the vehicle, which at 108 km/hour will advance about 3 centimeters in one millisecond.

Mechanical rigidity between the cameras of the stereo pair may be maintained to keep the sub-pixel level of mutual vibrations between the cameras, or in order to maintain mutual vibrations of about 0.5-5 angular minutes or better. This is due to a desire that disparities between the corresponding pixels on the images will be essentially due to the stereo configuration and not to mutual vibrations of the cameras, while maintaining the effect of mutual vibrations insignificant even at the sub-pixel level of stereo matching.

3D information about the environment from stereo cameras enhances the ADAS system performance at least in the following aspects: (1) distance to the detected objects can be used both in verification of detections and in selection of appropriate scale of region for detection; (2) a 3D map of the environment can be used for object segmentation and detection; (3) a 3D map of the environment used for road segmentation—as a substantially flat area; (4) a 3D map of the environment used for detection of otherwise un-classified obstacles and objects;

According to some embodiments of the present invention, an ADAS may include improved image processing. Improving image processing may be achieved by: (1) limiting detailed image processing to specific areas or angles determined to be relevant to the current driving situation, (2) targeted processing designed to identify specific objects, shapes or motions (for example, an image processing algorithm designed to identify other vehicles and specifically monitor their location, orientation and motion may be implemented, or detailed image processing may be performed only in relation to objects moving over a given speed or only above a certain size). According to some embodiments, image processing may include an object size threshold (or other shape/dimension/speed criteria) for processing, in order to avoid image processing in relation to small objects irrelevant to the driving. According to further embodiments, an ADAS may include processing logic adapted to correlate processing to distance, such that images/video of areas that are closer are processed differently than areas that are farther away.

According to some embodiments, an ADAS may also include one or more sensors adapted to monitor/sense an interior of the vehicle and/or the persons within. An ADAS may include one or more sensors adapted to detect parameters relating to the driver of the vehicle and processing circuitry adapted to assess mental conditions/alertness of the driver and modify operational parameters of the ADAS based on the drivers assessed condition. For example, alert thresholds may be adjusted based on driver alertness. Further, directions of driver gaze as well as current awareness may be used to modify ADAS operation. For example, an ADAS system may prioritize areas the driver is not looking towards.

According to some embodiments, an ADAS system may be adapted to determine locations and characteristics (e.g. weight) of persons present in the vehicle and modify/activate safety systems accordingly. For example, an ADAS may deploy airbags in an accident based on passenger location and weight.

The disclosed ADAS systems may comprise sensors acquiring data from the environment, vehicle sensors observing the driver and passengers, one or more processors that process the acquired data, one or more interfaces, for relaying relevant warnings or information to the driver and receiving commands from driver and passengers, and possibly, to further interface with the car systems/controls for modifying of the car responses to the driver control actions, activate safety systems/devices and/or direct engagement of the car controls by the ADAS system.

Sensors acquiring the data from the environment may comprise video cameras, acquiring video as a sequence of consecutive frames. Individual frames may be referred to as frames, or images, or by similar terms.

In some embodiments the ADAS system comprises a wide angle camera facing the road in the forward direction and adapted to be mounted on a vehicle in an appropriate location (e.g. the rear-view mirror, the hood, front grill, etc.), and a stereo pair of cameras with a narrower field of view also facing the road in the forward direction and adapted to be mounted on a vehicle in an appropriate location (e.g. the windshield, the hood, front grill, headlamps, etc.).

The stereo pair of cameras may be fixed in place (e.g. glued to the windshield), adjusted and calibrated, so that their field of view, and its orientation, are known relative to a geometry of the vehicle they are mounted on. The wide angle camera, mounted on the rear-view mirror, may have degrees of freedom, via rotating and turning of the mirror, or via movement of the camera relative to the mirror. The degrees of freedom of the wide angle camera can be described by the angles of yaw, pitch and roll.

The optical parameters of the lens of the wide angle camera may be known. The degrees of freedom of the wide angle camera relative to the stereo pair may be determined and disambiguated by the techniques of image registration and search for the correspondence points between the images from wide angle camera, and images from the cameras of the stereo pair.

The images acquired by wide angle camera may have higher pixel count then images acquired by cameras of the stereo pair or vice versa.

The images acquired by wide angle camera may be used to detect the objects, the road and the background. The objects may include different types of vehicles, motorcycles, bicycles, road signs, traffic signs and traffic lights, pedestrians, children, animals, background, buildings, forestation etc.

A 3D map of the environment and/or objects may be reconstructed by a pair of stereo cameras. The reconstructed 3D map has multiple uses. 3D map can be used for object segmentation, for verification of object detection, for rejecting false detections, for object detection due to spatial (depth) 3D separation of the object from its environment. A 3D shape of the road and the environment can be used for road detection, and segmentation of it from the environment.

3D map allows to measure the distance to the detected objects, including the vehicles, pedestrians, road-signs and environment, and therefore to evaluate their motion as well as self-motion of the host vehicle.

In some embodiments an object detection algorithm runs only and/or more heavily over regions of interest, which may constitute only part of the input images. In some embodiments neural networks or deep neural networks can be used for object detection.

One of the goals of a car detection algorithm is to detect the cars on the ego-lane (the lane the system vehicle is travelling in) of the host vehicle that comprise a potential risk of collision and to convey the relevant data to a collision estimation algorithm. In some embodiments car detection comprises a stage of feature extraction and a detection of the base of extracted features, after they are fed into the pre-trained classifier.

The terms detector and classifier will be used interchangeably. Conventionally a detector is defined as the engine which detects the presence of objects of a particular class, or classes, in the input, while a classifier is an engine which attributes the labels of two or more classes to the input query. Detection, however, can also be considered a classification problem, where there are two classes 'object present' and 'object absent'.

Similarly, the classifier can be considered a detector, which output is not only a binary yes/no answer, but also the class label of the detected object, or even vector of probabilities that particular region contains an object belonging to certain classes.

Various detection algorithms can be used for object detection, and we will list some non-limiting examples. In the classical approach to object detection three separate stages can be distinguished:

(1) Image is divided into sets of overlapping regions of different scales. As the object being detected can be present in the image at any unknown distance and location, the regions are selected in such a way, that for any possible scale and location of the object there will be at least one region of corresponding scale and location, so that said region will be approximately centered around the object, and its scale will be proportional to the object size for facilitating robust detection;

(2) Feature extraction, when from the pixel values within the given region the feature vector values of that region are derived. The goal of the feature extraction is to obtain an image representation that is more efficient for object detection. Various features are known in the art, such as HOG (Histogram of Oriented Gradients), SIFT (Scale Invariant Feature Transform), SURF (Speed Up Robust Features), PCA (Principal Component Analysis) and many others. Mathematically, feature extraction can be considered as the transformation from the input signal space to the feature space, where the feature space is constructed to maximize the variance between the classes and minimize the variance within the classes, thus facilitating the classification.

(3) Finally, the features extracted from the labelled training set images are used to train the classifier, and later the features extracted from the test images are fed into the classifier to detect the objects in the input images. Various classifiers are known in the art, with SVM (Support Vector Machines) and Decision Forest classifiers being among the most successful and popular.

Recently, the Deep Neural Networks (DNN) emerged as the most efficient object detection method, at least for the cases with sufficiently large computation power and training sets. The first layers of multilayer neural networks can be considered as performing the transformation to the feature space, while the last layers perform the classification/detection.

Both feature extraction and processing of the extracted features in the detector are computationally demanding tasks. Furthermore, searching for the objects at different scales and at different locations of the image combinatorially increases the amount of calculations. Consider the problem of object detection in the acquired video, for example detection of a car. A single very close car can occupy most of the image area, while an image of a distant car can be just a few pixels across. Without prior knowledge regarding expected scale and location of the object, the search must be performed over all locations and scales of the image. The regions of each scale form a regular grid of overlapping regions over the image, which amounts to a huge amount of calculations, as illustrated in FIG. 2.

Figure 2:
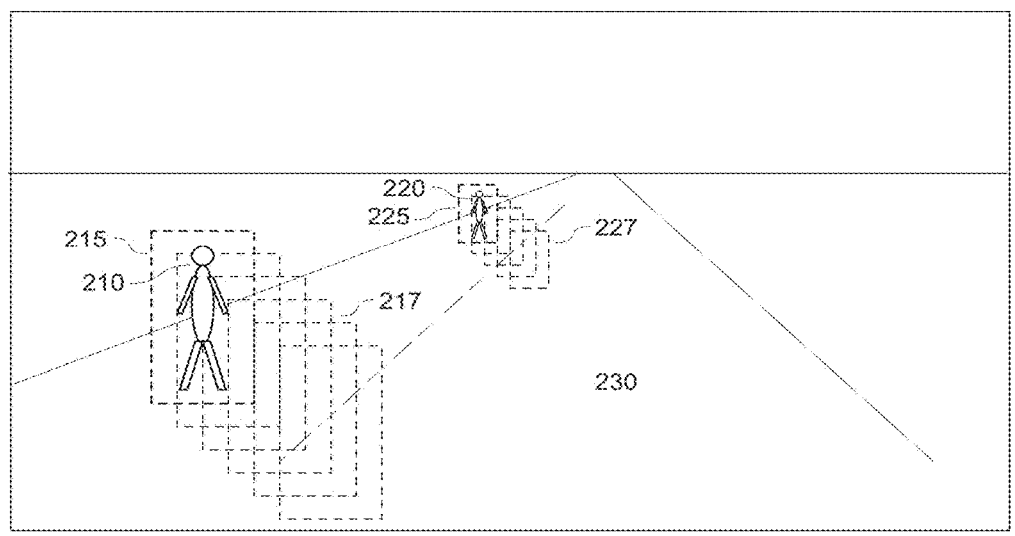
FIG. 2 illustrates exemplary search regions within an image evaluated by an exemplary object detector component of an ADAS, all according to some embodiments of the present invention.

FIG. 2 illustrates small subset of the regions forming a search grid. Consider a pedestrian 210, and the region 215 around him. In order to detect the pedestrian 210 the whole image should be scanned at this scale, at all the different locations. 217 shows some of the locations. Consider a pedestrian 220, and the region 225 around him. In order to detect the pedestrian 220 the whole image should be scanned at this scale, at all the different locations. 227 shows some of the locations.

The search regions should be overlapping, with the step between them proportional to the size of the region, usually 25% of the region size or less. The aspect ratio can depend on the nature of the object to be detected. For car detection the regions will be usually square shaped, while for pedestrian detection the preferred regions will be vertically oriented rectangles.

For the 1920*1080 frame of the high definition video, there are about 192*108≈20,000 positions with the step of 10 pixels in each direction, and there are 500,000 locations with the step of 2 pixels in each direction.

The total amount of regions of search on the different scales can amount to millions, and it is further multiplied by thousands to hundreds of thousands of operations within each region during the feature extraction, and recognition stages, which amounts to multiple billions of computer operations for object detection operation alone.

The computational requirements for computer vision applications are always very demanding, and the hardware resources are always limited, which is especially true for the ADAS applications, where the sensitivity to hardware price, limited heat dissipation, demands of short response and processing time, and plenty of computational demanding tasks, eager to trade additional computation resources for improved performance bring the demand of algorithmic efficacy to the extreme.

Therefore ADAS algorithms undergo strict runtime profiling, analysis and optimization. Furthermore, during 1 hour of ADAS operation at 30 frames per second, there are about 100,000 input frames. Multiplying this by up to 1 million or more different locations and scales searched for recognition of pedestrians, cars, road and traffic signs, traffic lights, bicycles and other objects, we count that up to 100,000,000 potential object locations may be checked during one hour driver, while even single false alarm given by the system once in an hour will annoy the driver. At the same time missing even one pedestrian or collision warning can lead to grave consequences.

Therefore methods allowing reduction of the amount of computations, screen out false detections and improve detection accuracy are of crucial value for ADAS system. Below we disclose the following methods to improve ADAS processing:

Reducing the amount of computations in object detection operation by selecting the search regions for detection in accordance with an expected or detected position of the road and relevant background within the image.

FIG. 1A presents a simplified view of an exemplary road scene. It can include road area with marked lanes, various types of vehicles, bikes, tracks, pedestrians, animals, traffic signs, traffic lights and so on.

ADAS systems acquire and analyze road situations and assist the driver by timely warning him when certain risks are detected. Analysis of road situation comprises: lower level operations of detection, by which the vehicles, pedestrians, road lanes, traffic signs and lights are detected, and operations of higher level analysis, by which the risk situations are detected, such as unintended departure from the lane, potential collision with a vehicle or pedestrian, or potential disobedience to traffic regulations, signs, lights and rules.

Figure 1B:
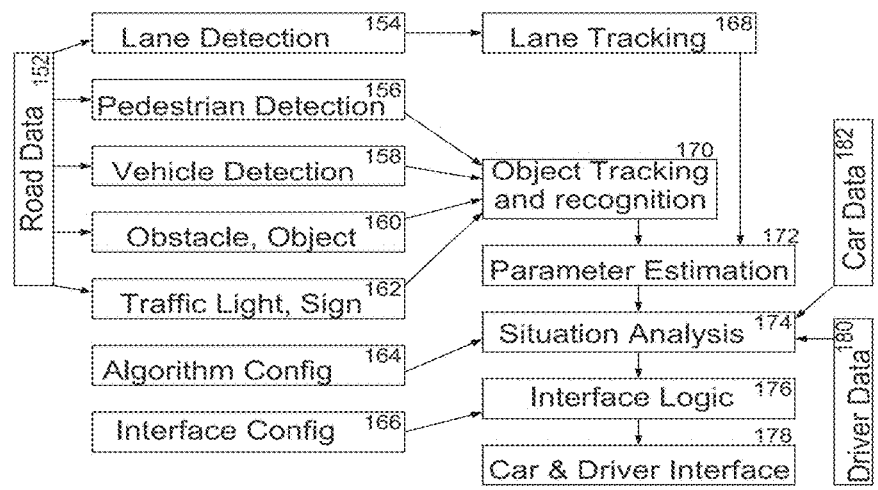
FIG. 1B presents a flow chart of an exemplary ADAS algorithm, according to some embodiments of the present invention. It should be understood that further embodiments may comprise only some of the disclosed elements.

FIG. 1B presents a flow chart of an exemplary ADAS algorithm. In some embodiments only some of the disclosed elements are implemented, and some other novel elements are described in other places of this disclosure.

Bloc 152 denotes input from road observing sensors, such as video cameras (e.g. a single front looking camera). The video input is directed towards various detectors, which may include Lane Detector 154, Pedestrian Detector 156, Vehicle Detector 158, other obstacle and objects detector 160, Traffic Light, Sign, and road sign detectors 162.

The detectors can operate on several different modes. For the implementations on the hardware with low computational power, the classical detection scheme, comprising a feature extraction stage and the detection stage may be applied. Feature extraction is a transformation operation, where input image pixel representation in a pixel space is transformed into a representation in the feature space.

The features selected for image representation can be HOG (Histogram of Oriented Gradients), SIFT (Scale Invariant Feature Transform), SURF (Speed Up Robust Features), BRIEF (Binary Robust Independent Elementary Features), ORB (Oriented Rotated BRIEF), LESH (Local Energy based Shape Histogram) or any other feature space, selected for the considerations of efficiency.

The detector can be based on SVM (Support Vector Machines), Decision Trees, Decision Forests or any other machine learning method, selected for considerations of efficiency.

The two primary characteristics of any detector are recall and precision. High recall rate means low number of missed objects (false negatives, miss-detections), and high precision rate means low number of false positives (false alarms).

The third crucial characteristic of a detector, as well as any other algorithm used in ADAS, is the number of operations performed during its execution. Execution time of the algorithm equals to number of operations within, divided by the execution speed (also called processing power) of the hardware.

Modern (2016) lower end embedded hardware perform about $10^{\wedge}10$ operations per second, middle range performs perform about $10^{\wedge}11$ and high end about $10^{\wedge}12$ floating point operations per second. An ADAS performs analysis of the associated road situation for a certain time and, if a dangerous situation is detected, the driver is notified by an alarm. Therefore the warning related to a certain situation is issued to the driver not at the exact moment when it occurs, but after a delay associated with image acquisition and scene processing. This delay is added to the driver reaction time, and therefore the requirement to keep the delay short is critical.

The processing time of ADAS should be 100 milliseconds or less, preferably less than 50 milliseconds, while a processing time above 200 milliseconds is intolerable in most situations.

Alternative solutions for detectors is a Neural Network based method, including Deep Learning methods, which demonstrate much better recall and precision, however usually require substantial processing resources, and are not suitable for lower end embedded hardware platforms.

The detectors 154, 156, 158, 160, 162 may process the input obtained from the environment, which is denoted as Road Data 152. In many embodiments the Road Data is video input from the forward cameras, such as a wide angle adjustable camera, with optional mono or stereo cameras rigidly fixed to the car, for example fixed on the windshield.

The coordinates and confidence level of the detected objects are fed into the object tracking module 170. Object tracker keeps the history of types and positions of detected objects as they were and may have access to the raw image for refined processing and detection in specific regions of interest, which are usually vicinities of detected or expected object locations.

This refined processing allows to achieve several goals: Filter out false detections, reduce amount of misses, smooth out the object motion by more accurate position estimation, determine the object speed and distance to it, etc. More accurate but slower detectors can be executed again over the detection in the specific regions of interest, which are usually vicinities of detected or expected object locations. Indeed, in the detection stage the object position and scale are known, reducing the amount of search and processing by the orders of thousands compared to the detector. Furthermore, a detector output may contain a measure of confidence level. A standalone detector can only compare this confidence level with a threshold, whereas a tracker can take into account previous detections, such that a determination can be made based on repeated detection at a lower confidence level, while filtering out sporadic false detections even at higher confidence levels.

Lane tracker 168 tracks an already detected lane by constantly updating the estimated lane parameters on the basis of both lane parameters known for the previous frame and probabilities of new lane parameters. The lane parameters are estimated and updated with principle of continuity, favoring gradual and smooth change of the lane parameters. Mathematically, filtering techniques such as Kalman Filters are applied, while the physical foundation of the approach based on the fact that line estimate changes gradually due to gradual movement of the vehicle and the camera.

Block 172 denotes the software module estimating the parameters of the detected objects, such as distance and speed of the cars, distance and time to collision and relation to the road lane of cars, pedestrians, obstacles, position and type of the road lanes, recognition of particular types of the traffic signs, color of traffic lights, position of the car relatively to the lane, road, etc.

Block 174 performs the high-level analysis of the road situation, on the basis of the parameters received from 172, as well as the data from the car (own speed, state of turn winkers, lights, breaks, wheel). In some embodiments there is also driver monitoring data 180 from a camera in the visible or infrared range or other sensor. The driver alertness level and attention point are evaluated in 180, and they influence on the situation analysis in 174, and determining the alert thresholds.

For example a certain low collision risk with hefty amount of time combined with the high alertness level of the driver and his glance in the direction of potential danger might not lead to issuance of the collision warning, while exactly the same road situation, but with the driver distracted by his phone is a completely different story. Additional input to situation analysis module 174 is the Algorithm Configuration parameters 164, which can be adapted via high level tuning of the system on the training data.

Finally, the decisions about issuing the specific warnings to the driver or outputs to the car controls on the basis of information extracted in 174 are taken in the interface logic module 176, which configuration is defined by 166.

FIG. 2 illustrates the reason for huge amount of computations in the detector, searching for the objects, such as vehicles, pedestrians or traffic signs. 210 denotes pedestrian at larger scale, 215 denotes the bounding box of appropriate scale and location around the said pedestrian, and 217 shows a trail of bounding boxes of the same scale at other locations. In order not to miss a pedestrian within the image, the search is conventionally performed at all locations and scale within the image.

Similarly 220 denotes the pedestrian at smaller scale, 225 an appropriate bounding box at corresponding location and scale, and 227 a small subset of the bounding boxes at that scale.

Figure 3:
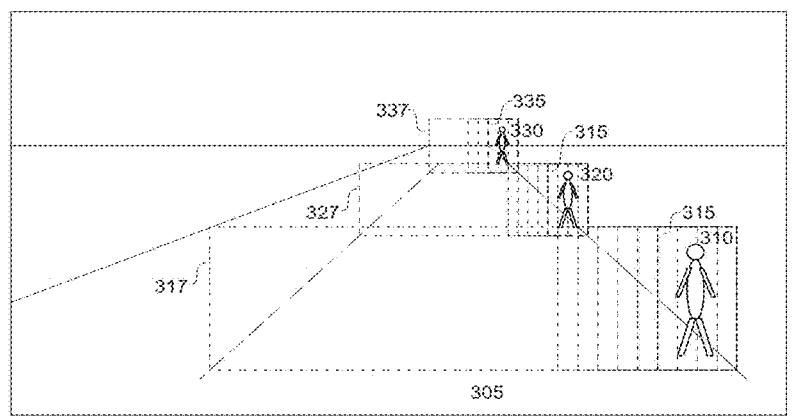
FIG. 3 illustrates an exemplary efficient method of object search by an ADAS, taking into account an estimated object size and location relative to the road and the lane, all according to some embodiments of the present invention.

FIG. 3 illustrates one of the disclosed ways for reducing the computational burden of the detectors. 310, 320 and 330 denote the pedestrians at different scales due to different distances from the camera, while 315, 325 and 335 denote the bounding boxes at corresponding scales and locations. 305 denotes the self-lane of the car motion. One can note that the relevant scale for the objects depend on the distance from the camera, and the location of the relevant objects is limited to the motion trajectory of the vehicle (referred to as 'self-lane'). Regions 317, 327 and 337 denote the regions of search at corresponding scales and locations. The bounding boxes in the detector search should overlap in order to search at every possible location.

The set of overlapping boxes form a grid over the image. The step between neighbor boxes is conventionally chosen proportional to the box size, and therefore it is the smallest at the smallest scale, and often equals 1-2 pixels. Therefore the scan by detector over the object regions at the smallest scales (e.g. region 337) contain the biggest amount of regions and constitute the heaviest computation burden. Comparing the region 337 to the total area of the image, one can estimate the potential benefit of the detector run-time with the disclosed approach, which is estimated by factors of hundreds and thousands.

For example, let us consider a search for a pedestrian of a size of about 10×36 pixels in the image. The small size of the object requires a proportionally small region for the search, which will be about 12×40 pixels. For the global search for the pedestrian within the frame, the whole frame should be covered by the grid of overlapping regions, with horizontal steps between the regions of about 2 pixels, and vertical steps between the regions of about 4 pixels. Thus, there will be (1920−12)/2=854 horizontal positions of the grid and (1080−40)/4=260 vertical positions, yielding a total of (1+(1920−12)/2)*(1+(1080−40)/4)=855*261=223155 various regions only at this particular scale. Estimating about 10,000 operations within each region for feature extraction and classification results in about 2 billion operations required for object detection within the frame only at this particular scale, which is an intolerably large amount of computations for most practical systems.

Alternatively, if the search region area is reduced solely to the appropriate relevant region at proper location on the road, such as region 337, let us assume that the region area size is 80*40 pixels, in which case it will contain only (1+(80−12)/4)*(1+(40−40)/2)=18 search regions, which results in about 12400 times less computations than in the previous brute-force approach!

All the numbers given above are given for illustration purposes only, and can vary essentially between different embodiments.

One of the methods to determine distance to objects according to embodiments of the present invention, is from a 3D map, obtained from stereo camera images. Another is from the object position relatively to the road, where the road is determined by lane and road detection algorithms. Object size in an image can also be used to determine distance. As certain dimensions of many objects are known and the size of an object in an image is relative to its distance from the camera, the size of a known dimension in an image can be used to calculate distance to the object. For example, distance to a car ahead may be calculated based on the height of its license plate in an image. Range sensors may also be used (e.g. laser range sensors), or reference markers, or any other depth determining method known today or to be devised in the future.

Figure 4:
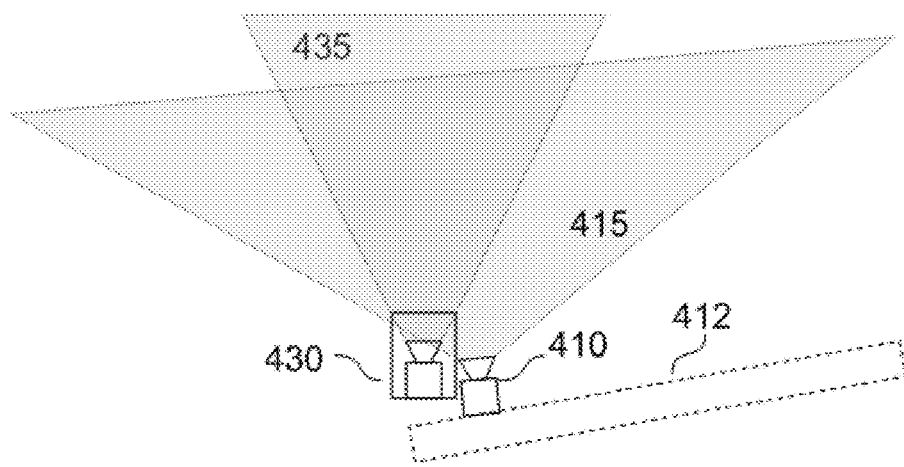
FIG. 4 illustrates an exemplary combined use of an adjustable camera and a fixed camera, according to some embodiments of the present invention.

FIG. 4. There are contradicting requirements for the camera field of view in an ADAS. The desire to distinguish the pedestrian or vehicle as early as possible, leads to the requirement of a camera with a narrow field of view, allowing imagining of remote objects with higher resolution, however, may miss objects on the sides due to the narrow field of view.

The desire to capture the objects on the sides, including the pedestrians off the shoulders in close proximity to the vehicle, traffic signs and traffic lights which are close and/or on the side or above the vehicle, particularly in situations such as slower driving in urban environments or standing near a crosswalk, lead to the requirement of a wide angle of view of camera, which captures objects in lateral directions, but images the remote objects with less pixels, blurred and missing details.

The conventional way to mount an ADAS video camera is by permanently and rigidly attaching it to the car body or the windshield, which allows calibration of the camera position and direction relative to the car body, and better isolates the camera from light reflections from the windshield.

Many drivers install a video-registration car camera, which is usually a wide-angle camera, which generally points forward, but which location and direction often varies and can be adjusted by the driver. Many such cameras are mounted or built into the rear view mirror. It is a natural desire to add ADAS functionality to such a car camera, however, this severely handicaps the ADAS functionality, due to the absence of calibration of video-registration car cameras, which direction can be changed by the driver at any moment.

One of the ways to solve the above conundrums is by rigidly attaching one or more narrow field of view cameras to the car body or the windshield, and simultaneously using wide field of view adjustable cameras, such as the video-registration cameras. FIG. 4 schematically illustrates the above disclosure. 410 is the wide angle camera, attached to the rear-view mirror 412, and 415 illustrates its field of view.

430 illustrates a narrow view camera, fixed to the windshield, car body or otherwise attached fixed relative to the car body. 435 illustrates the field of view of the permanently attached camera 430, which in some embodiments can be narrower than 415. The camera rigidly attached to the car body or windshield will be also referred to as 'fixed camera'.

In some embodiments the direction of the adjustable camera is calibrated via finding the mutual correspondence with the images acquired by the fixed camera.

Figure 5:
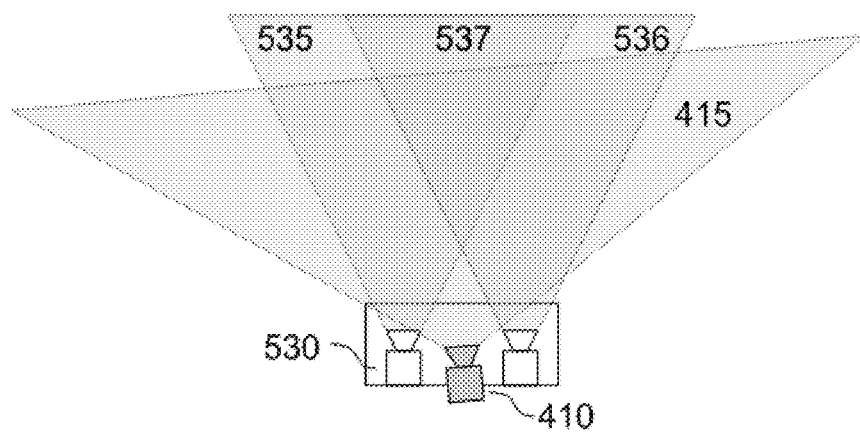
FIG. 5 illustrates an exemplary combined use of an adjustable camera and a fixed stereo pair of cameras, according to some embodiments of the present invention.

In some embodiments the above fixed camera can be a stereo camera, comprised of two cameras, as illustrated on the FIGS. 5. 535 and 536 illustrate the fields of view of respective cameras from the stereo pair 530, while 537 is the overlapping region of their fields of view, where the stereo matching can be done and a distance map extracted. Once depth information is extracted from the overlapping area, depth information can be estimated/calculated in the non-overlapping area using known depth estimation techniques.

In the cases of full or partial image obstruction in one of the cameras caused by mud, rain, windshield wiper or other reasons, the unobstructed camera of the stereo pair is used as an input for obstructed image regions.

Figure 6:
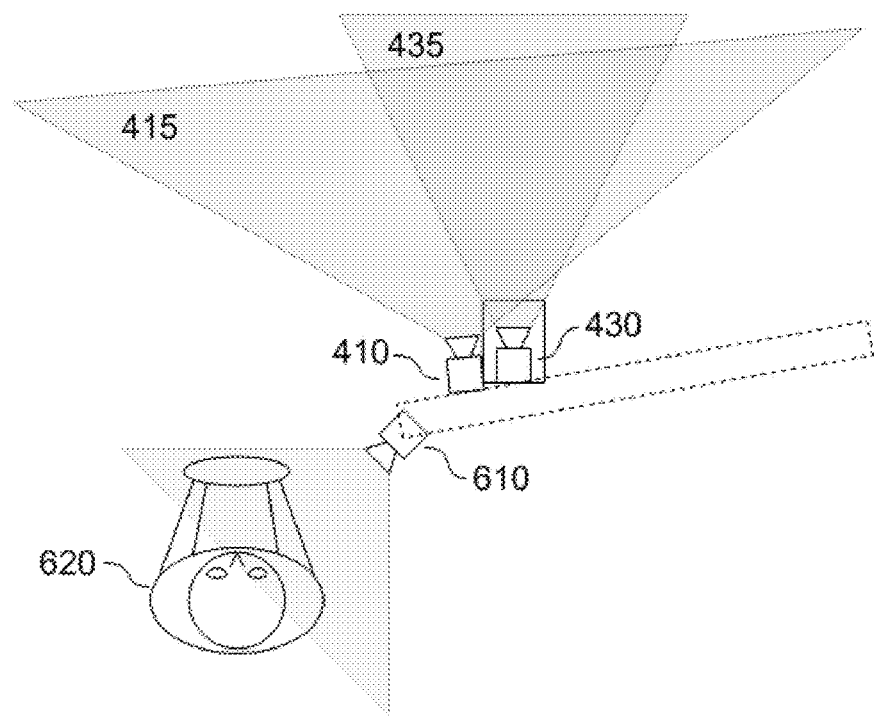
FIG. 6 schematically illustrates exemplary fields of view of a forward looking cameras and a driver monitoring camera, according to some embodiments of the present invention.

Consider FIG. 6. The goal of the ADAS system is to increase the driving safety and improve the driver experience. In this realm the problem of adjusting the warning thresholds is a non-trivial compromise. By raising the warning threshold too high, the system may miss a situation requiring driver warning, or miss the proper time by giving the warning too late, after the situation has deteriorated, leaving less time and options for driver reaction. By setting the warning thresholds too low, the system can become a driver's unhelpful annoyance by giving warnings in the normal or borderline situations, when the driver is attentive, fully aware and confident about the situation and his driving style.

One of the disclosed solutions to this contradiction is by using a driver monitoring camera. The warning threshold is adapted in accordance to estimated driver alertness and/or a direction of his attention. For example, if the potential obstacle is detected, but the driver is fully alert and looking in the direction of the obstacle, the warning threshold level remains relatively high or even slightly elevated, and the alert is not triggered. In the opposite case, if driver inattentiveness is detected, or his glance is astray from the potentially dangerous obstacle, the alert threshold is lowered, and therefore an alert can be triggered even in a relatively low risk situation. FIG. 6 schematically illustrates the above disclosures. 620 denotes a driver holding a driving wheel, 610 a camera monitoring a driver; 410 and 430 the adjustable and the fixed cameras; 415 and 435 their corresponding fields of view.

In some embodiments the driver monitoring camera can also support the driver interface with the system, including the gesture interface and voice interface.

Furthermore, driver/passenger 3D position and pose within the car is estimated from the driver monitoring camera and sensors, and their position is used for accident mitigation controls and airbag deployment. In the case of an imminent accident situation (area 852 on plot from FIG. 8), vehicle controls may be applied to mitigate consequences of braking. In addition to brakes, the car position can be altered, in order to protect the driver, passengers and corresponding adjacent vehicle regions. For example, car throttle, steering and braking can be applied to alter the position, orientation and/or speed of the vehicle to either avoid a collision or modify parameters of the collision to minimize injury (e.g. turn the car so the collision is in the rear of the car instead of the driver door).

Smart airbag deployment takes into account the driver/passenger body position, so that they better protected and not injured by deploying airbags.

Figure 7A:
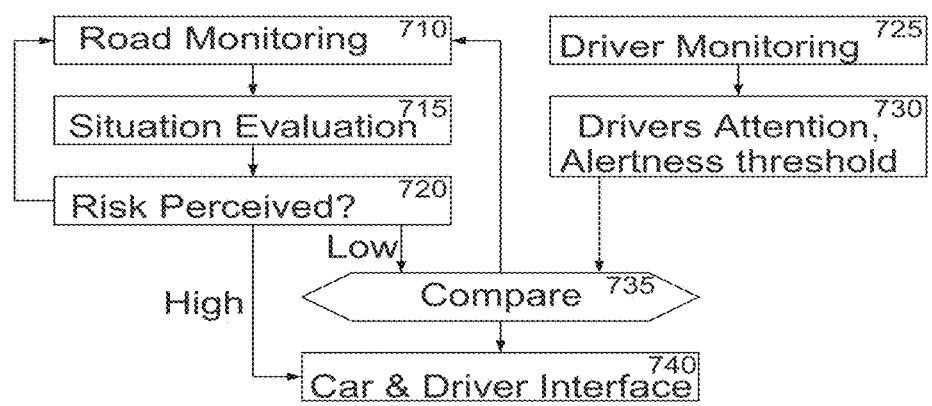
FIG. 7A is a flowchart showing steps of an exemplary method of triggering a warning signal, depending on a driver alertness level/value, according to some embodiments of the present invention.

FIG. 7A presents a flow chart illustrating principles of incorporating driver monitoring into an ADAS system. Blocks 710 and 715 represent an exemplary ADAS algorithm in the simplified form, block 725 denotes input from the driver monitoring sensors, and block 730 analysis of the said input. The level of driver attention can be evaluated by analysis of his glance direction, correlation and delays between the glance direction and the potential risk situations detected and recognized by ADAS, as well as by correlation and delay between the driver controls applied to the car and the corresponding situations detected by ADAS. For example, an ADAS may measure the time between a detected event on the road and the time of driver reaction to the event. Further, driver profiles may be created to serve as reference parameters. For example, an ADAS may record for each driver standard reaction times such that personal alertness assessment can be made.

For the situations which constitute a clear and high level risk, the corresponding alerts or car controls are initiated, as denoted by the arrow 'High' from block 720 towards block 740. For situations without risk the monitoring is continued, from block 710, while for the boundary cases of relatively low risk, the driver alertness level and direction of his attention are compared with the risk. If the driver glances in the direction of the detected potential collision, and the distance is still relatively large, while the risk is relatively low, the warning might be postponed until or unless the higher risk perceived at the later stages, while in the contrary case of the driver distracted by his phone or other objects within the car, the warning threshold will be reduced drastically.

Figure 7B:
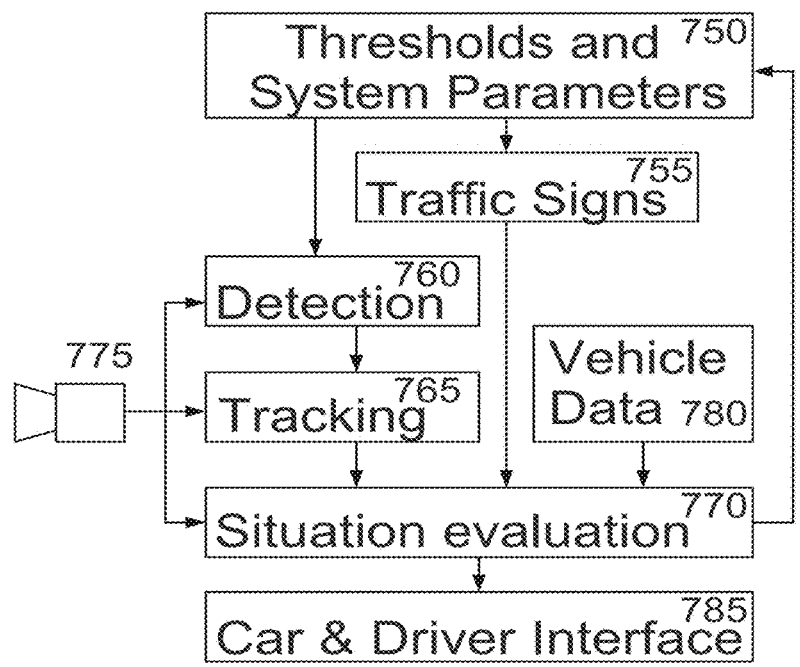
FIG. 7B presents a flow chart illustrating exemplary principles of situation aware ADAS operation.

FIG. 7B presents a flow chart illustrating principles of situation aware ADAS operation. 750 denotes the sensitivity thresholds of the detectors, as well as areas and accuracy of search, distribution of computational resources and priorities in algorithm execution, etc. 755 denotes a traffic sign detection module; 760 and 765 Denote all the various detector and corresponding tracking modules and algorithms in the system—including lane, pedestrian, vehicles and other objects; 780 denotes all the sensors and interfaces obtaining data from the vehicle—such as speed, state of lights and indicators, brakes, steering wheel direction, etc; 775 denotes one or more video cameras, providing the video input; 770 denotes the high level situation evaluation module, which on the basis of the input from the detection/tracking, and vehicle data summarizes the current situation, and sends appropriate outputs for the module 785 of car and driver interface, for issuing appropriate driver warnings and/or appropriate altering of the car controls.

The feedback from situation evaluation block 770 to thresholds and system parameters block 750 denotes the adaptive update of the system parameters and facilitates the situation adaptive ADAS behavior and tuning. For example, if a traffic sign signalizing school or children is detected, the speed warning threshold may be reduced and the pedestrian detection algorithm may obtain more computational resources, the pedestrian detection and warning thresholds may be reduced, shifting the response curve towards fewer misses, even on account of an increased probability of false alarms.

Figure 8:
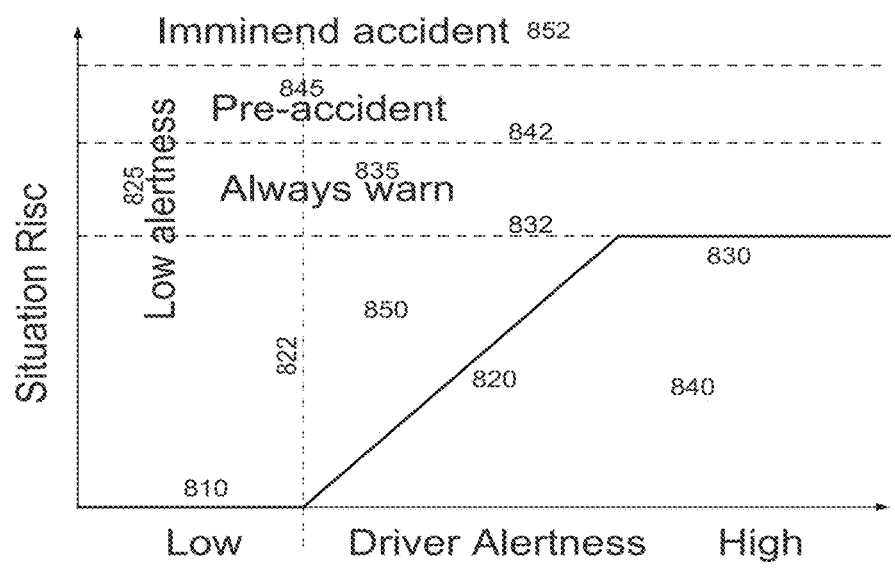
FIG. 8 illustrates an exemplary threshold level for alert trigger as a function of driver alertness, according to some embodiments of the present invention.

FIG. 8 presents a plot illustrating the relation between the situation risk, driver alertness and warnings or car controls issued by the system.

Further, an interface to driver devices and/or car devices may be added to an ADAS. Such an interface may receive data from driver/car devices as to driver use of the device at particular times and assess his/her attention level accordingly. For example, if a signal from a driver phone indicates that he just opened an sms message, the ADAS may conclude he is currently distracted and less attentive to driving. Similarly a signal from the car media system that the driver is currently operating the radio/navigation system.

In FIG. 8, the horizontal axis indicates the level of the driver alertness, while the vertical axis indicates a risk of the road situation evaluated by the system. 810, 820 and 830 are the sections of the plot, separating the no-warning zone 840 from the warning zone 850.

The warning zone denotes the state where either warning to the driver or special controls to the vehicle are issued. Special controls may include reduction of the engine power, halting of acceleration, application of brakes, alternating the sensitivity of controls in order to prevent or mitigate the accident and/or any other intervention in vehicle control. For the sake of brevity, either warning to the driver, or applying the appropriate controls to the car, or both of them together are referred to as 'ADAS warning'.

825 denotes the area of intolerably low driver alertness, in which case the warning is issued regardless of road situations. Zone 835, 845 and 852 refer to the road situations which risk is estimated higher than the tolerable threshold, and warning is issued regardless of the driver attention level. 835 regards the warning zone, 845 severe warning zone, while 852 the accident mitigation zone. What kinds of warnings to the driver and accident mitigation controls to the car are issued depends on particular embodiment, and as well as algorithm and interface configurations 164 and 166 shown on FIG. 1.

Finally, section 810 of the plot denotes the trade-off region, where the warning issuance and type depends on both estimated situation risk and the driver alertness level.

According to some embodiments, there may be provided a system for computer vision based driver assistance. Said system may comprise one or more of:

an adjustable camera having an angle of view of 75 degrees or greater and adapted to be adjustably mounted to a vehicle, such that the orientation of said camera in relation to the vehicle is adjustable;

one or more exterior facing image sensors adapted to be mounted to a vehicle, such as to capture images of an area in front of the vehicle;

one or more interior sensors adapted to be positioned within a vehicle and sense parameters relating to an alertness of a driver of the vehicle;

one or more fixed cameras, having an angle of view of 70 degrees or less and adapted to be mounted to a vehicle, such that the orientation of said camera in relation to the vehicle is fixed;

sensors adapted to sense positions of the driver of the vehicle and passengers within the vehicle first processing circuitry communicatively coupled to said adjustable and fixed cameras and adapted to process images captured by said adjustable and fixed cameras to identify hazardous situations relating to the vehicle;

communication circuitry adapted to communicate over a distributed data network;

one or more driver monitors comprising interior facing image sensors adapted to be positioned within a vehicle and sense a direction of gaze of a driver of the vehicle;

second processing circuitry communicatively coupled to said first processing circuitry and said driver monitors and adapted to:
  (i) determine a level of risk for each identified hazardous situation, and
  (ii) issue a warning or intervene in vehicle control, upon determining a level of risk associated with a given hazardous situation is above a dynamic threshold;

third processing circuitry communicatively coupled to the interior sensors and adapted to:
  (i) issue a warning or intervene in vehicle control, upon determining a level of risk associated with a given hazardous situation is above a dynamic threshold;
  (ii) wherein the dynamic threshold is dependent upon a current alertness of the driver determined by the processing circuitry based upon the parameters sensed by said interior sensors relating to an alertness of a driver of the vehicle.

According to some embodiments, the one or more fixed cameras comprise at least two cameras having an angle of view of 70 degrees or less;

According to some embodiments, the at least two cameras capture stereo images of an area in front of the vehicle and the first processing circuitry is further adapted to derive depth information relating to objects appearing in the images based on the stereo images;

According to some embodiments, the first processing circuitry is further adapted to compensate for view obstructions of one of the at least two cameras using image data captured by a different camera of the at least two cameras.

According to some embodiments, the first processing circuitry is further adapted to use the fixed cameras to calibrate said adjustable camera.

According to some embodiments, the adjustable camera is adapted to be mounted on a rear view mirror of the vehicle.

According to some embodiments, the fixed cameras are adapted to be mounted on a windshield of the vehicle.

According to some embodiments, the fixed cameras are adapted to be mounted adjacent to headlights of the vehicle.

According to some embodiments, the first processing circuitry is adapted to utilize a neural network to perform at least a portion of the image processing.

According to some embodiments, the adjustable camera is adapted to be mounted on a rear view mirror of the vehicle and the fixed cameras include at least two cameras adapted to be mounted on a windshield of the vehicle.

According to some embodiments, the dynamic threshold is dependent upon a current direction of gaze of the driver sensed by said driver monitor.

According to some embodiments, the said second processing circuitry is further adapted to measure a lapse of time between each: (a) occurrence of one or more given hazardous situations, of the identified hazardous situations, and (b) a turn of the direction of gaze of the driver towards the given hazardous situation.

According to some embodiments, the second processing circuitry is further adapted to assess an alertness of the driver based on the measured lapses of time.

According to some embodiments, the system is further adapted to:
 a. dynamically create, for each of a set of individual users, reference time lapse data, between occurrences of hazardous situations and turn of gaze towards the hazardous situations, by recording reference time lapse data for each of the individual users; and
 b. compare time lapse data of current identified hazardous situations to reference time lapse data for a current driver, to thereby assess an alertness of the current driver.

According to some embodiments, the second processing circuitry is further adapted to manipulate controls of the vehicle to alter a point of impact to thereby mitigate injury to the driver and passengers based on the sensed positions of the driver and passengers.

According to some embodiments, the third processing circuitry is further adapted to receive signals from media devices within the vehicle, indicating a level of interaction of the driver with the media devices, and factor a current level of interaction indicated by the media devices when assessing a current alertness of the driver.

It should also be understood by one of skill in the art that some of the functions described as being performed by a specific component of the system may be performed by a different component of the system in other embodiments of this invention.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those skilled in the art. It is, therefore, to be understood that the appended claims are intended to cover all such modifications and changes.

The invention claimed is:

1. A system for computer vision based driver assistance, said system comprising:
 an adjustable camera having an angle of view of 75 degrees or greater and adapted to be adjustably mounted to a vehicle, such that the orientation of said camera in relation to the vehicle is adjustable;
 one or more fixed cameras, having an angle of view of 70 degrees or less and adapted to be mounted to a vehicle, such that the orientation of said camera in relation to the vehicle is fixed;
 first processing circuitry communicatively coupled to said adjustable and fixed cameras and adapted to process images captured by said adjustable and fixed cameras to identify hazardous situations relating to the vehicle;
 one or more driver monitors comprising interior facing image sensors adapted to be positioned within a vehicle and sense a direction of gaze of a driver of the vehicle;
 second processing circuitry communicatively coupled to said first processing circuitry and said driver monitors and adapted to:
 (i) determine a level of risk for each identified hazardous situation, and
 (ii) issue a warning or intervene in vehicle control, upon determining a level of risk associated with a given hazardous situation is above a dynamic threshold; wherein the dynamic threshold is dependent upon a current direction of gaze of the driver sensed by said driver monitor.

2. The system according to claim 1, wherein said one or more fixed cameras comprise at least two cameras having an angle of view of 70 degrees or less.

3. The system according to claim 2, wherein said at least two cameras capture stereo images of an area in front of the vehicle and said first processing circuitry is further adapted to derive depth information relating to objects appearing in the images based on the stereo images.

4. The system according to claim 2, wherein said first processing circuitry is further adapted to compensate for view obstructions of one of the at least two cameras using image data captured by a different camera of the at least two cameras.

5. The system according to claim 1, wherein said first processing circuitry is further adapted to use said fixed cameras to calibrate said adjustable camera.

6. The system according to claim 1, wherein said adjustable camera is adapted to be mounted on a rear view mirror of the vehicle.

7. The system according to claim 1, wherein said fixed cameras are adapted to be mounted on a windshield of the vehicle.

8. The system according to claim 1, wherein said fixed cameras are adapted to be mounted adjacent to headlights of the vehicle.

9. The system according to claim 1, further comprising communication circuitry adapted to communicate over a distributed data network, wherein said first processing circuitry is adapted to utilize a neural network to perform at least a portion of the image processing.

10. The system according to claim 1, wherein said adjustable camera is adapted to be mounted on a rear view mirror of the vehicle and said fixed cameras include at least two cameras adapted to be mounted on a windshield of the vehicle.

11. The system according to claim 1, wherein said second processing circuitry is further adapted to measure a lapse of time between each: (a) occurrence of one or more given hazardous situations, of the identified hazardous situations, and (b) a turn of the direction of gaze of the driver towards the given hazardous situation.

12. A system for computer vision based driver support, said system comprising:
   one or more exterior facing image sensors adapted to be mounted to a vehicle, such as to capture images of an area in front of the vehicle;
   one or more driver monitors comprising interior facing image sensors adapted to be positioned within a vehicle and sense a direction of gaze of a driver of the vehicle;
   processing circuitry communicatively coupled to said exterior facing image sensors and said driver monitors and adapted to:
   (i) process images captured by said exterior facing image sensors to identify hazardous situations relating to the vehicle;
   (ii) determine a level of risk for each identified hazardous situation, and
   (iii) issue a warning or intervene in vehicle control, upon determining a level of risk associated with a given hazardous situation is above a dynamic threshold; wherein the dynamic threshold is dependent upon a current direction of gaze of the driver sensed by said driver monitor.

13. The system according to claim 12, wherein said processing circuitry is further adapted to measure a lapse of time between each: (a) occurrence of one or more given hazardous situations, of the identified hazardous situations, and (b) a turn of the direction of gaze of the driver towards the given hazardous situation.

14. The system according to claim 13, wherein said processing circuitry is further adapted to assess an alertness of the driver based on the measured lapses of time.

15. The system according to claim 13, wherein said system is further adapted to:
   a. dynamically create, for each of a set of individual users, reference time lapse data, between occurrences of hazardous situations and turn of gaze towards the hazardous situations, by recording reference time lapse data for each of the individual users; and
   b. compare time lapse data of current identified hazardous situations to reference time lapse data for a current driver, to thereby assess an alertness of the current driver.

16. The system according to claim 12, further comprising sensors adapted to sense positions of the driver of the vehicle and passengers within the vehicle.

17. The system according to claim 16, wherein said processing circuitry is further adapted to manipulate controls of the vehicle to alter a point of impact to thereby mitigate injury to the driver and passengers based on the sensed positions of the driver and passengers.

18. A system for computer vision based driver support, said system comprising:
   one or more image sensors adapted to be mounted to a vehicle; such as to capture images of an area in front of the vehicle;
   one or more interior sensors adapted to be positioned within a vehicle and sense parameters relating to an alertness of a driver of the vehicle;
   processing circuitry communicatively coupled to said image sensors and said interior sensors and adapted to:
   (i) process images captured by said image sensors to identify hazardous situations relating to the vehicle;
   (ii) determine a level of risk for each identified hazardous situation, and
   (iii) issue a warning or intervene in vehicle control, upon determining a level of risk associated with a given hazardous situation is above a dynamic threshold; wherein the dynamic threshold is dependent upon a current alertness of the driver determined by the processing circuitry based upon the parameters sensed by said interior sensors relating to an alertness of a driver of the vehicle.

19. The system according to claim 18, wherein said processing circuitry is further adapted to receive signals from media devices within the vehicle, indicating a level of interaction of the driver with the media devices, and factor a current level of interaction indicated by the media devices when assessing a current alertness of the driver.

* * * * *